Oct. 10, 1933.    G. J. MORRIS    1,929,708
HANDLE SECURING MEANS FOR VALVES
Filed June 22, 1932
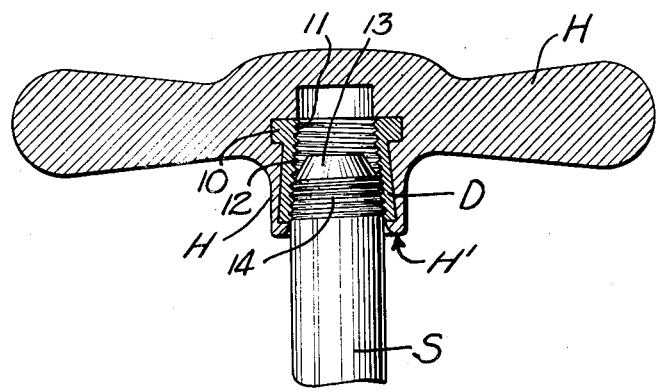
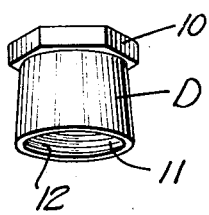
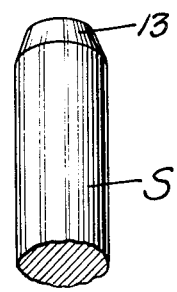
INVENTOR.
GEORGE J. MORRIS
BY
ATTORNEYS.

Patented Oct. 10, 1933

1,929,708

UNITED STATES PATENT OFFICE 1,929,708

HANDLE SECURING MEANS FOR VALVES

George J. Morris, Los Angeles, Calif.

Application June 22, 1932. Serial No. 618,747

1 Claim. (Cl. 287—53)

This invention relates to and has for its purpose the provision of simple and positive means, preferably in the form of a thread cutting die permanently associated with a valve handle and capable of cutting threads on an end of a normally unthreaded valve stem with the utmost ease and dispatch by the operation of applying the handle to the stem, and in a manner to rigidly secure the handl to the stem, to the end of dispensing with tools of any character as well as eliminating all extraneous and exposed fastening devices, whereby to greatly simplify and materially decrease the cost incident to the assembling of the valve handle and stem, and all while enabling the handle to be readily removed from the stem should the occasion require.

It is a further purpose of this invention to provide securing means for valve handles structurally characterized in a manner to enable stems of various diameters to be accommodated with equal facility and effectiveness.

Only one form of this invention will be described, following which its novel features will be pointed out in the claim.

In the accompanying drawing,

Figure 1 is a view showing in section one form of securing means embodying this invention, and illustrating the manner in which it is associated with a valve handle and valve stem;

Figure 2 is a perspective view of the securing means;

Figure 3 is a fragmentary perspective view of a valve stem previous to the securing of the valve handle thereto.

Referring specifically to the drawing, wherein similar reference characters designate similar parts in each of the several views, this invention comprises a thread cutting element in the form of a die D of hardened metal which is preferably permanently embedded and fixed in a valve handle H during the operation of molding the latter from metal alloys, porcelain or other suitable material.

The die D is slightly tapered and of cylindrical form, with its inner end having an enlarged and non-circular head 10 which functions to positively lock the die against relative turning and other displacement in the handle. The handle includes a hub H by which most of the die is contained, there being means for anchoring the die in the hub so that the die will not come out. One form of such means is the extension of the hub under the die at H'. The turnunder H' aids the non-circular head 10 in the purpose described. The die is provided with a bore 11 therethrough which is tapered so as to reduce in diameter inwardly of the handle; and the wall of the bore is provided with threads 12, it being noted that the larger end of the bore is open or exposed from the handle for the reception of a valve stem S.

The valve stem S, of which only the outer end portion has been illustrated, is normally smooth or unthreaded exteriorly, and is of a material softer than that of the die. The outer extremity of the stem can be beveled as indicated at 13, and its diameter is such as to enable it to enter the larger end of the bore 11, so that by rotating the handle on the stem and concurrently exerting pressure on the handle axially towards the stem, the threads 12 of the die D will bite into the softer material of the stem to thus cut similar threads 14 on the stem and thereby rigidly secure the handle to the stem.

The tapered form of the bore 11 not only insures a rigid connection but also enables stems of various diameters within certain limits to be accommodated, and it will be manifest that by the simple expedient of a screwing movement of the handle on the end of a normally unthreaded stem, that a positive and secure connection will be produced between the handle and stem, while permitting the handle to be removed from the stem by an unscrewing movement should it become necessary or desirable. Furthermore, the connection provided by this invention between the handle and stem is entirely concealed from view so as not to detract in any manner from the appearance of the assembly.

What is claimed is:

A handle adapted to be applied to unthreaded valve stems, said handle having a hub portion and being provided with a hardened die adapted to cut threads on the stem by the operation of applying the handle thereto, said die being embedded in the hub portion of the handle by which portion most of the die is contained, means for anchoring said die in the hub, and non-circular means on the die embedded in the handle to prevent relative turning.

GEORGE J. MORRIS.